US010482832B2

(12) United States Patent
Jeon et al.

(10) Patent No.: US 10,482,832 B2
(45) Date of Patent: Nov. 19, 2019

(54) DISPLAY APPARATUS AND A METHOD OF DRIVING THE SAME

(71) Applicant: SAMSUNG DISPLAY CO., LTD., Yongin-si, Gyeonggi-Do (KR)

(72) Inventors: Byungkil Jeon, Hwaseong-si (KR); Sun-Koo Kang, Seoul (KR); Seunghwan Moon, Asan-si (KR); Junpyo Lee, Asan-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 230 days.

(21) Appl. No.: 15/462,059

(22) Filed: Mar. 17, 2017

(65) Prior Publication Data

US 2017/0330523 A1 Nov. 16, 2017

(30) Foreign Application Priority Data

May 13, 2016 (KR) ........................ 10-2016-0058553

(51) Int. Cl.
*G06F 5/00* (2006.01)
*G09G 3/36* (2006.01)

(52) U.S. Cl.
CPC ......... *G09G 3/3648* (2013.01); *G09G 3/3688* (2013.01); *G09G 2310/08* (2013.01); *G09G 2320/0223* (2013.01)

(58) Field of Classification Search
CPC ............... G09G 3/3648; G09G 3/3688; G09G 2320/0223; G09G 2310/08
See application file for complete search history.

(56) References Cited

U.S. PATENT DOCUMENTS

2014/0347404 A1* 11/2014 Lee .......................... G09G 5/18 345/690
2014/0375703 A1 12/2014 Ban et al.
2015/0022512 A1* 1/2015 Ahn ..................... G09G 3/3607 345/212
2015/0097871 A1* 4/2015 Kumeta ............... G09G 3/2003 345/690

FOREIGN PATENT DOCUMENTS

KR 1020150000807 1/2015
KR 1020150055253 5/2015
KR 1020160053070 5/2016

* cited by examiner

*Primary Examiner* — Kent W Chang
*Assistant Examiner* — Andrew Lee
(74) *Attorney, Agent, or Firm* — F. Chau & Associates, LLC

(57) ABSTRACT

A display apparatus includes a display panel, a gate driving part, and a data driving part. The display panel is configured to display an image, and includes a gate line and a data line. The gate driving part is configured to output a gate signal to the gate line. The data driving part is configured to output a data signal to the data line. A transition time of the data signal is a time when the data signal transitions from a low level to a high level, and the transition time of the data signal increases according to a decrease of a load of the display panel.

19 Claims, 17 Drawing Sheets

160

| AREA | PWRC |
|---|---|
| DA1 | PWRC1 |
| DA2 | PWRC2 |
| DA3 | PWRC3 |
| DA4 | PWRC4 |

FIG. 8

260

| AREA | LINE | PWRC | TPC |
|---|---|---|---|
| DA1 | LINE1 | PWRC1 | TPC1 |
| | LINE2 | | TPC2 |
| | ⋮ | | ⋮ |
| | LINEh | | TPCh |
| DA2 | LINE(h+1) | PWRC2 | TPC(h+1) |
| | LINE(h+2) | | TPC(h+2) |
| | ⋮ | | ⋮ |
| | LINEi | | TPCi |
| DA3 | LINE(i+1) | PWRC3 | TPC(i+1) |
| | LINE(i+2) | | TPC(i+2) |
| | ⋮ | | ⋮ |
| | LINEj | | TPCj |
| DA4 | LINE(j+1) | PWRC4 | TPC(j+1) |
| | LINE(j+2) | | TPC(j+2) |
| | ⋮ | | ⋮ |
| | LINEk | | TPCk |

FIG. 11

360

| AREA | LINE | PWRC | TPC | LOD |
|---|---|---|---|---|
| DA1 | LINE1 | PWRC1 | TPC1 | LOD1 |
| | LINE2 | | TPC2 | |
| | ⋮ | | ⋮ | |
| | LINEh | | TPCh | |
| DA2 | LINE(h+1) | PWRC2 | TPC(h+1) | LOD2 |
| | LINE(h+2) | | TPC(h+2) | |
| | ⋮ | | ⋮ | |
| | LINEi | | TPCi | |
| DA3 | LINE(i+1) | PWRC3 | TPC(i+1) | LOD3 |
| | LINE(i+2) | | TPC(i+2) | |
| | ⋮ | | ⋮ | |
| | LINEj | | TPCj | |
| DA4 | LINE(j+1) | PWRC4 | TPC(j+1) | LOD4 |
| | LINE(j+2) | | TPC(j+2) | |
| | ⋮ | | ⋮ | |
| | LINEk | | TPCk | |

DISPLAY APPARATUS AND A METHOD OF DRIVING THE SAME

CROSS-REFERENCE TO RELATED APPLICATION

This application claims priority under 35 U.S.C. § 119 to Korean Patent Application No. 10-2016-0058553, filed on May 13, 2016 in the Korean Intellectual Property Office (KIPO), the disclosure of which is incorporated by reference herein in its entirety.

TECHNICAL FIELD

Exemplary embodiments of the present inventive concept relate to an image display, and more particularly, to a display apparatus and a method of driving the display apparatus.

DISCUSSION OF RELATED ART

A display apparatus includes a display panel and a display panel driving apparatus.

In a liquid crystal display apparatus, the display panel includes a lower substrate, an upper substrate, and a liquid crystal layer disposed therebetween. The lower substrate includes a first base substrate, a gate line, a data line, a thin film transistor formed on the first base substrate, and a pixel electrode electrically connected to the thin film transistor. The upper substrate includes a second base substrate facing the first base substrate, a color filter formed on the second base substrate, and a common electrode formed on the color filter. The liquid crystal layer includes liquid crystal molecules whose arrangement is changed by an electric field generated between the pixel electrode and the common electrode.

The display panel driving apparatus includes a gate driving part, a data driving part, and a timing controlling part. The gate driving part outputs a gate signal to the gate line. The data driving part outputs a data signal to the data line. The timing controlling part controls timings of the gate driving part and the data driving part.

A load of the display panel increases as a distance between the data driving part and the data line increases. Thus, a transition time of the data signal at the data line is longer than a transition time of the data signal when it is output from the data driving part.

SUMMARY

According to an exemplary embodiment of the present inventive concept, a display apparatus includes a display panel, a gate driving part, and a data driving part. The display panel is configured to display an image, and includes a gate line and a data line. The gate driving part is configured to output a gate signal to the gate line. The data driving part is configured to output a data signal to the data line. A transition time of the data signal is a time when the data signal transitions from a low level to a high level, and the transition time of the data signal increases according to a decrease of a load of the display panel.

In an exemplary embodiment of the present inventive concept, the transition time of the data signal, output from the data driving part and applied to the data line, may increase as a distance between the data line and the data driving part decreases.

In an exemplary embodiment of the present inventive concept, the transition time of the data signal, output from the data driving part and applied to the data line, may increase as a resistor-capacitor (RC) resistance of the data line decreases.

In an exemplary embodiment of the present inventive concept, the display panel may sequentially include first to N-th (where N is a natural number not less than two) display areas in a direction in which the data line extends. The transition time of the data signal, output from the data driving part and applied to the first display area, may have a first time, and the transition time of the data signal, output from the data driving part and applied to the N-th display area, may have an N-th time that is shorter than the first time.

In an exemplary embodiment of the present inventive concept, transition times of the data signals, applied to the first to (N−1)-th display areas, may be controlled using the transition time of the data signal applied to the N-th display area and delayed.

In an exemplary embodiment of the present inventive concept, the display apparatus may further include a lookup table configured to store transition time control data for controlling the transition times of the data signals applied to the first to N-th display areas.

In an exemplary embodiment of the present inventive concept, the data driving part may output the data signal in response to a transfer pulse signal for controlling an output timing of the data signal. A high period of the transfer pulse signal for controlling the output timing of the data signal applied to the first display area may have a first period, and a high period of the transfer pulse signal for controlling the output timing of the data signal applied to the N-th display area may have an N-th period that is longer than the first period.

In an exemplary embodiment of the present inventive concept, the display apparatus may further include a lookup table configured to store transfer pulse data for controlling the high period of the transfer pulse signal.

In an exemplary embodiment of the present inventive concept, the data driving part may generate and output the data signal using image data to which luminance offset data, corresponding to the first to N-th display areas, is applied.

In an exemplary embodiment of the present inventive concept, the display apparatus may further include a lookup table configured to store the luminance offset data.

In an exemplary embodiment of the present inventive concept, the data driving part may generate and output the data signal using image data to which luminance offset data, corresponding to the first to N-th display areas, is applied.

In an exemplary embodiment of the present inventive concept, the display apparatus may further include a lookup table configured to store the luminance offset data.

In an exemplary embodiment of the present inventive concept, when image data to be displayed on the display panel is a toggle pattern, the transition time of the data signal may increase according to the decrease of the load of the display panel.

In an exemplary embodiment of the present inventive concept, when the image data to be displayed on the display panel is a direct current pattern, the transition time of the data signal may be maintained.

In an exemplary embodiment of the present inventive concept, when the image data to be displayed on the display panel includes a toggle pattern and a direct current pattern, the transition time of the data signal applied to an area displaying the toggle pattern may increase according to the decrease of the load of the display panel, and the transition time of the data signal applied to an area displaying the direct current pattern may be maintained.

According to an exemplary embodiment of the present inventive concept, a method of driving a display apparatus includes outputting a gate signal to a gate line of a display panel which displays an image, and outputting a data signal to a data line. A transition time of the data signal is a time when the data signal transitions from a low level to a high level, and the transition time of the data signal increases when a load of the display panel decreases.

In an exemplary embodiment of the present inventive concept, the display panel may sequentially include first to N-th (where N is a natural number not less than two) display areas in a direction in which the data line extends. The transition time of the data signal applied to the first display area may have a first time, and the transition time of the data signal applied to the N-th display area may have an N-th time that is shorter than the first time.

In an exemplary embodiment of the present inventive concept, transition times of the data signal, applied to the first to (N−1)-th display areas, may be determined using the transition time of the data signal applied to the N-th display area and delayed.

In an exemplary embodiment of the present inventive concept, the method may further include outputting a transfer pulse signal for controlling an output timing of the data signal. A high period of the transfer pulse signal for controlling the output timing of the data signal applied to the first display area may have a first period, and a high period of the transfer pulse signal for controlling the output timing of the data signal applied to the N-th display area may have an N-th period that is longer than the first period.

In an exemplary embodiment of the present inventive concept, outputting the data signal to the data line may include generating and outputting the data signal using image data to which luminance offset data, corresponding to the first to N-th display areas, is applied.

According to an exemplary embodiment of the present inventive concept, a display apparatus includes a display panel, a gate driving part, a data driving part, and a timing controlling part. The display panel is configured to display an image, and includes a gate line and a data line. The gate driving part is configured to output a gate signal to the gate line. The data driving part is configured to output a data signal to the data line. The timing controlling part includes a pattern detecting part, a lookup table, and a micro controlling part. The pattern detecting part is configured to receive first image data, detect patterns in the first image data, and output pattern detection data. The lookup table is configured to store parameters corresponding to a plurality of display areas in the display panel. The micro controlling part is configured to receive the first image data, generate second image data and transition time control data using the first image data, the pattern detection data, and the lookup table, and output the second image data and the transition time control data to the data driving part. The transition time control data is used to control a transition time and a slew of the data signal.

BRIEF DESCRIPTION OF THE DRAWINGS

The above and other features of the present inventive concept will become more apparent by describing in detail exemplary embodiments thereof with reference to the accompanying drawings.

FIG. 8 illustrates a lookup table storing TP control data for controlling the TP signal of FIGS. 7A to 7D according to an exemplary embodiment of the present inventive concept.

FIG. 11 illustrates a lookup table storing luminance offset data in second image data of FIG. 10 according to an exemplary embodiment of the present inventive concept.

DETAILED DESCRIPTION OF THE EMBODIMENTS

Figure 1:
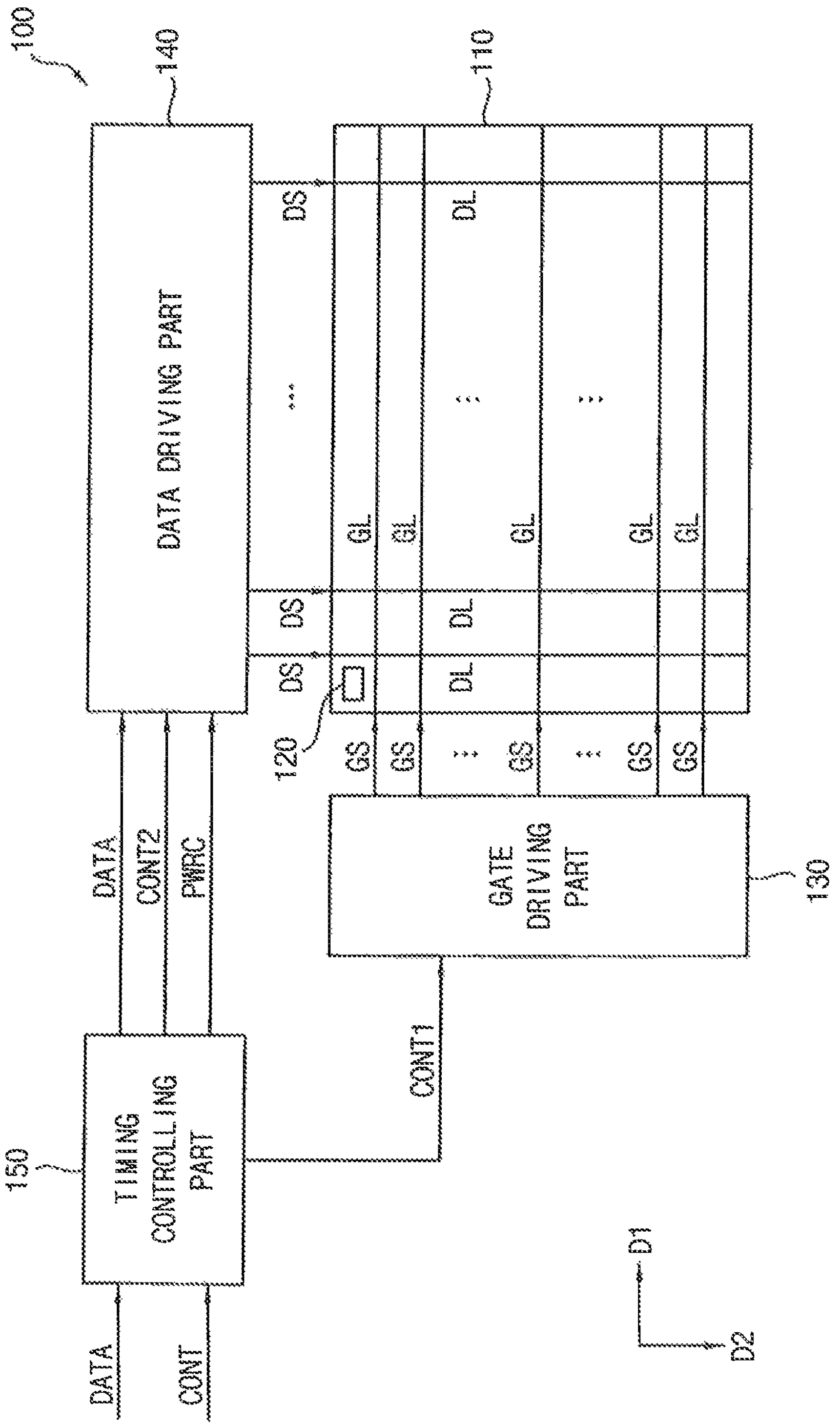
FIG. 1 is a block diagram illustrating a display apparatus according to an exemplary embodiment of the present inventive concept.

Exemplary embodiments of the present inventive concept will be described more fully hereinafter with reference to the accompanying drawings. Like reference numerals may refer to like elements throughout this application.

Exemplary embodiments of the present inventive concept provide a display apparatus with increased display quality.

Exemplary embodiments of the present inventive concept also provide a method of driving the above-mentioned display apparatus.

FIG. 1 is a block diagram illustrating a display apparatus according to an exemplary embodiment of the present inventive concept.

Referring to FIG. 1, a display apparatus 100 according to the present exemplary embodiment includes a display panel 110, a gate driving part 130, a data driving part 140, and a timing controlling part 150.

The display panel 110 receives a data signal DS from the data driving part 140 to display an image. The display panel 110 includes gate lines GL, data lines DL, and pixels 120. The gate lines GL extend in a first direction D1 and are arranged in a second direction D2 that is substantially perpendicular to the first direction D1. The data lines DL extend in the second direction D2 and are arranged in the first direction D1. Here, the first direction D1 may be substantially parallel to a long side of the display panel 110, and the second direction D2 may be substantially parallel to a short side of the display panel 110.

Figure 2:
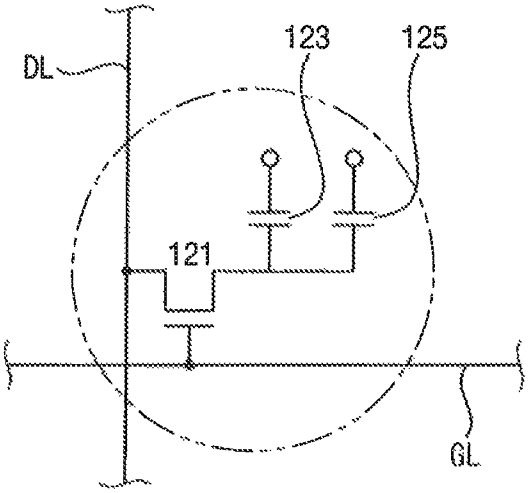
FIG. 2 is a circuit diagram illustrating a pixel of FIG. 1 according to an exemplary embodiment of the present inventive concept.

FIG. 2 is a circuit diagram illustrating a pixel of FIG. 1 according to an exemplary embodiment of the present inventive concept.

Referring to FIGS. 1 and 2, each of the pixels 120 may be defined by one of the gate lines GL and one of the data lines DL. Hereinafter, one the pixels 120 will be described with respect to one of the gate lines GL and one of the data lines DL. For example, the pixel 120 may include a thin film transistor 121 electrically connected to the gate line GL and the data line DL, a liquid crystal capacitor 123, and a storage capacitor 125 connected to the thin film transistor 121. In other words, the display panel 110 may be a liquid crystal display panel.

Figures 3, 4:
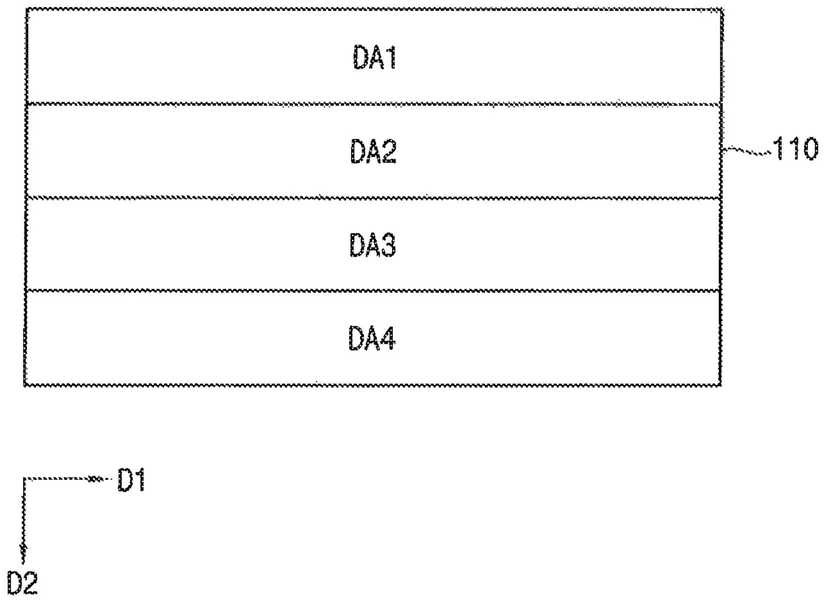
FIG. 3 is a plan view illustrating a display panel of FIG. 1 according to an exemplary embodiment of the present inventive concept.
FIG. 4 illustrates a lookup table storing transition time control data of FIG. 1 according to an exemplary embodiment of the present inventive concept.

FIG. 3 is a plan view illustrating a display panel of FIG. 1 according to an exemplary embodiment of the present inventive concept.

Referring to FIGS. 1 and 3, the display panel 110 may include a first display area DA1, a second display area DA2, a third display area DA3, and a fourth display area DA4. The first display area DA1, the second display area DA2, the third display area DA3, and the fourth display area DA4 may be sequentially disposed in the second direction D2. Thus, the first display area DA1 may be adjacent to the data driving part 140 and may include a first end of the data lines DL. The fourth display area DA4 is furthest from the data driving part 140 compared to the first display area DA1, the second display area DA2, and the third display area DA3. In addition, the fourth display area DA4 may include a second end of the data lines DL. The second display area DA2 is disposed between the first display area DA1 and the fourth display area DA4, and is adjacent to the first display area DA1. The third display area DA3 is disposed between the second display area DA2 and the fourth display area DA4.

A load of the display panel 110 or a resistor-capacitor (RC) resistance of the data lines DL in the second display area DA2 is greater than the load of the display panel 110 or the RC resistance of the data lines DL in the first display area DA1. The load of the display panel 110 or the RC resistance of the data lines DL in the third display area DA3 is greater than the load of the display panel 110 or the RC resistance of the data lines DL in the second display area DA2. The load of the display panel 110 or the RC resistance of the data lines DL in the fourth display area DA4 is greater than the load of the display panel 110 or the RC resistance of the data lines DL in the third display area DA3.

In the present exemplary embodiment, the display panel 110 includes the first display area DA1, the second display area DA2, the third display area DA3, and the fourth display area DA4, but the present inventive concept is not limited thereto. For example, the display panel 110 may include first to N-th (where N is a natural number) display areas sequentially disposed in the second direction D2. In this case, the fourth display area DA4 may correspond to the N-th display area.

Referring to FIG. 1 again, the gate driving part 130, the data driving part 140, and the timing controlling part 150 may be a display panel driving apparatus for driving the display panel 110.

The gate driving part 130 generates gate signals GS in response to a first control signal CONT1 provided from the timing controlling part 150, and outputs the gate signals GS to the gate lines GL.

The data driving part 140 receives image data DATA from the timing controlling part 150, generates the data signal DS based on the image data DATA, and outputs the data signal DS to the data lines DL in response to a second control signal CONT2 provided from the timing controlling part 150.

The timing controlling part 150 receives the image data DATA and a control signal CON from an outside source (e.g., a host). The control signal CON may include a horizontal synchronous signal, a vertical synchronous signal, and a clock signal. The timing controlling part 150 generates the first control signal CONT1 using the control signal CON and outputs the first control signal CONT1 to the gate driving part 130. In addition, the timing controlling part 150 generates the second control signal CONT2 using the control signal CON and outputs the second control signal CONT2 to the data driving part 140.

In addition, the timing controlling part 150 outputs transition time control data PWRC, for controlling the transition time and the slew of the data signal DS, to the data driving part 140. The transition time may be a time when the data signal DS transitions from a low level to a high level. The slew may be a slope between the low level and the high level of the data signal. Alternatively, the slew may be a slope between the low level and about X % of the high level of the data signal. For example, 'X' may be about 90. Thus, the slew of the data signal may decrease as the transition time of the data signal increases.

FIG. 4 illustrates a lookup table storing transition time control data of FIG. 1 according to an exemplary embodiment of the present inventive concept.

Referring to FIGS. 1, 3, and 4, a lookup table 160 may store first transition time control data PWRC1, second transition time control data PWRC2, third transition time control data PWRC3, and fourth transition time control data PWRC4 corresponding to the first display area DA1, the second display area DA2, the third display area DA3, and the fourth display area DA4, respectively. The first transition time control data PWRC1 is data for controlling the transition time and the slew of the data signal DS output from the data driving part 140 and applied to the first display area DA1. The second transition time control data PWRC2 is data for controlling the transition time and the slew of the data signal DS output from the data driving part 140 and applied to the second display area DA2. The third transition time control data PWRC3 is data for controlling the transition time and the slew of the data signal DS output from the data driving part 140 and applied to the third display area DA3. The fourth transition time control data PWRC4 is data for controlling the transition time and the slew of the data signal DS output from the data driving part 140 and applied to the fourth display area DA4.

The second transition time control data PWRC2 is greater than the first transition time control data PWRC1. The third transition time control data PWRC3 is greater than the second transition time control data PWRC2. The fourth transition time control data PWRC4 is greater than the third transition time control data PWRC3.

According to an exemplary embodiment of the present inventive concept, when the display panel 110 includes the first to N-th display areas, the lookup table 160 may include first to N-th transition time control data corresponding to the first to N-th display areas, respectively. The first to N-th transition time control data may be sequentially increased.

According to an exemplary embodiment of the present inventive concept, the lookup table 160 may be included in the timing controlling part 150.

Figure 5A:
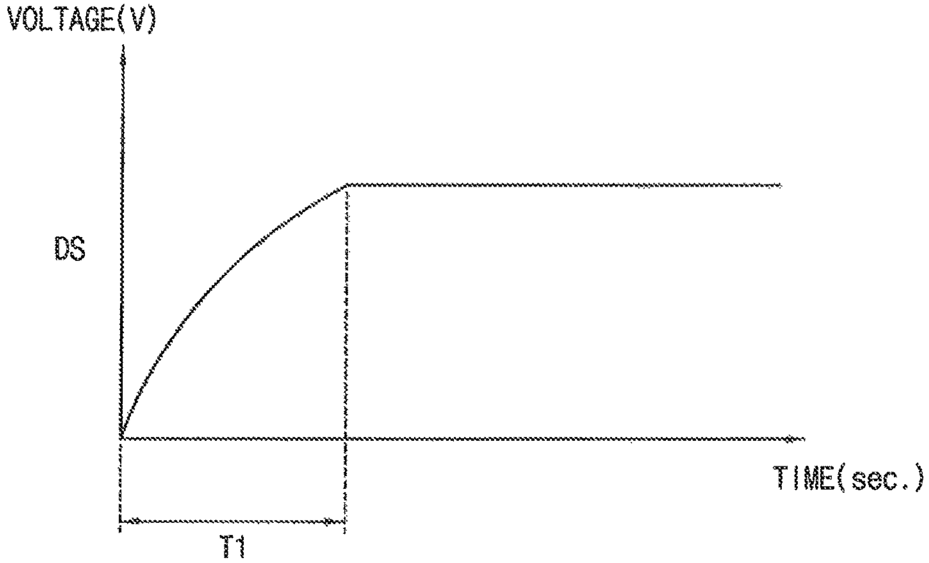
FIG. 5A is a timing diagram illustrating a data signal output from a data driving part of FIG. 1 and applied to a first display area of FIG. 3 according to an exemplary embodiment of the present inventive concept.

FIG. 5A is a timing diagram illustrating a data signal output from a data driving part of FIG. 1 and applied to a first display area of FIG. 3 according to an exemplary embodiment of the present inventive concept.

Referring to FIGS. 1, 3, and 5A, the transition time of the data signal DS, output from the data driving part 140 and applied to the first display area DA1, may be a first time T1. The first time T1 may be controlled by the first transition time control data PWRC1.

Figure 5B:
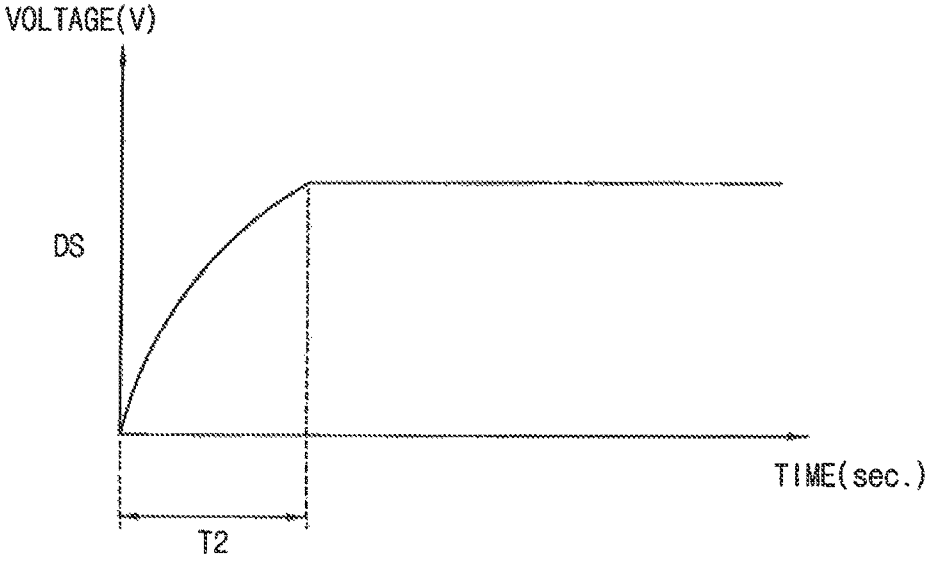
FIG. 5B is a timing diagram illustrating the data signal output from the data driving part of FIG. 1 and applied to a second display area of FIG. 3 according to an exemplary embodiment of the present inventive concept.

FIG. 5B is a timing diagram illustrating the data signal output from the data driving part of FIG. 1 and applied to a second display area of FIG. 3 according to an exemplary embodiment of the present inventive concept.

Referring to FIGS. 1, 3, and 5B, the transition time of the data signal DS output from the data driving part 140 and applied to the second display area DA2 may be a second time T2. The second time T2 is shorter than the first time T1. Thus, the slew of the data signal DS output from the data driving part 140 and applied to the second display area DA2 is greater than that of the data signal DS output from the data driving part 140 and applied to the first display area DA1. The second time T2 may be controlled by the second transition time control data PWRC2.

Figure 5C:
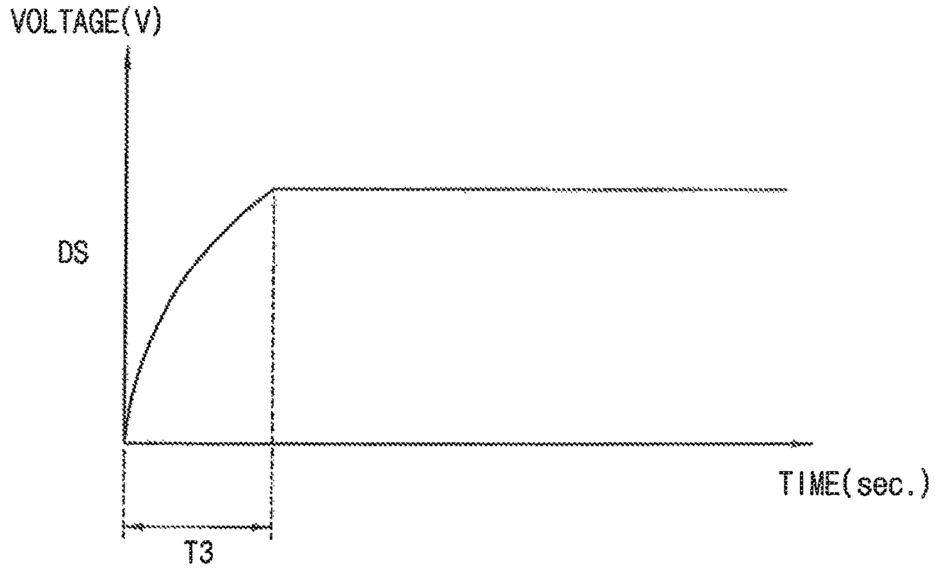
FIG. 5C is a timing diagram illustrating the data signal output from the data driving part of FIG. 1 and applied to a third display area of FIG. 3 according to an exemplary embodiment of the present inventive concept.

FIG. 5C is a timing diagram illustrating the data signal output from the data driving part of FIG. 1 and applied to a third display area of FIG. 3 according to an exemplary embodiment of the present inventive concept.

Referring to FIGS. 1, 3, and 5C, the transition time of the data signal DS output from the data driving part 140 and applied to the third display area DA3 may be a third time T3. The third time T3 is shorter than the second time T2. Thus, the slew of the data signal DS output from the data driving part 140 and applied to the third display area DA3 is greater than that of the data signal DS output from the data driving part 140 and applied to the second display area DA2. The third time T3 may be controlled by the third transition time control data PWRC3.

Figure 5D:
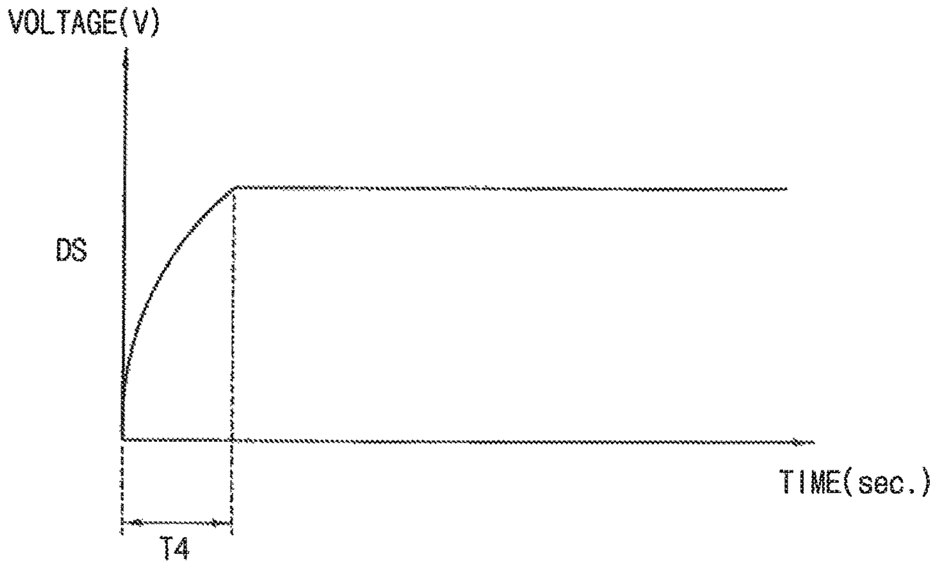
FIG. 5D is a timing diagram illustrating the data signal output from the data driving part of FIG. 1 and applied to a fourth display area of FIG. 3 according to an exemplary embodiment of the present inventive concept.

FIG. 5D is a timing diagram illustrating the data signal output from the data driving part of FIG. 1 and applied to a fourth display area of FIG. 3 according to an exemplary embodiment of the present inventive concept.

Referring to FIGS. 1, 3, and 5D, the transition time of the data signal DS output from the data driving part 140 and applied to the fourth display area DA4 may be a fourth time T4. The fourth time T4 is shorter than the third time T3. Thus, the slew of the data signal DS output from the data driving part 140 and applied to the fourth display area DA4 is greater than that of the data signal DS output from the data driving part 140 and applied to the third display area DA3. The fourth time T4 may be controlled by the fourth transition time control data PWRC4.

When the display panel 110 includes the first to N-th display areas, the transition times of the data signal DS, output from the data driving part 140 and applied to the first to N-th display areas, may be first to N-th times, respectively. Here, the first to N-th times may be sequentially decreased.

The transition time and the slew of the data signal DS may be changed according to a driving current of the data driving part 140. Alternatively, the transition time and the slew of the data signal DS may be changed according to a high period of a clock signal in the second control signal CONT2 applied to the data driving part 140.

As described above, the load of the display panel 110 or the RC resistance of the data lines DL in the second display area DA2 is greater than the load of the display panel 110 or the RC resistance of the data lines DL in the first display area DA1. The load of the display panel 110 or the RC resistance of the data lines DL in the third display area DA3 is greater than the load of the display panel 110 or the RC resistance of the data lines DL in the second display area DA2. The load of the display panel 110 or the RC resistance of the data lines DL in the fourth display area DA4 is greater than the load of the display panel 110 or the RC resistance of the data lines DL in the third display area DA3.

In addition, the transition time of the data signal DS output from the data driving part 140 and applied to the first display area DA1 is the first time T1, the transition time of the data signal DS output from the data driving part 140 and applied to the second display area DA2 is the second time T2 that is shorter than the first time T1, the transition time of the data signal DS output from the data driving part 140 and applied to the third display area DA3 is the third time T3 that is shorter than the second time T2, and the transition time of the data signal DS output from the data driving part 140 and applied to the fourth display area DA4 is the fourth time T4 that is shorter than the third time T3.

Therefore, by controlling the transition times of the data signal DS as described, the transition time of the data signal DS at the data lines DL in the first display area DA1, the transition time of the data signal DS at the data lines DL in the second display area DA2, the transition time of the data signal DS at the data lines DL in the third display area DA3, and the transition time of the data signal DS at the data lines DL in the fourth display area DA4 are substantially the same. Thus, a pixel data charge rate in the first display area DA1, the second display area DA2, the third display area DA3, and the fourth display area DA4 may be substantially the same.

The first time T1, second time T2, third time T3, and fourth time T4 may be controlled based on the transition time of the data signal DS at the data lines DL in the fourth display area DA4.

The load of the display panel 110 in the fourth display area DA4 is greater than each of the load of the display panel 110 in the first display area DA1, the load of the display panel 110 in the second display area DA2, and the load of the display panel 110 in the third display area DA3. Therefore, the transition time of the data signal DS at the data lines DL of the fourth display area DA4 is longer than each of the transition time of the data signal DS at the data lines DL of the first display area DA1, the transition time of the data signal DS at the data lines DL of the second display area DA2, and the transition time of the data signal DS at the data lines DL of the third display area DA3. Therefore, heat and power consumption of the data driving part 140 may be decreased.

When the display panel 110 includes the first to N-th display areas, transition times of the data signal DS output from the data driving part 140 and applied to the first to N-th display areas may be controlled based on the transition time of the data signal DS at the data lines DL of the N-th display area.

Figure 6:
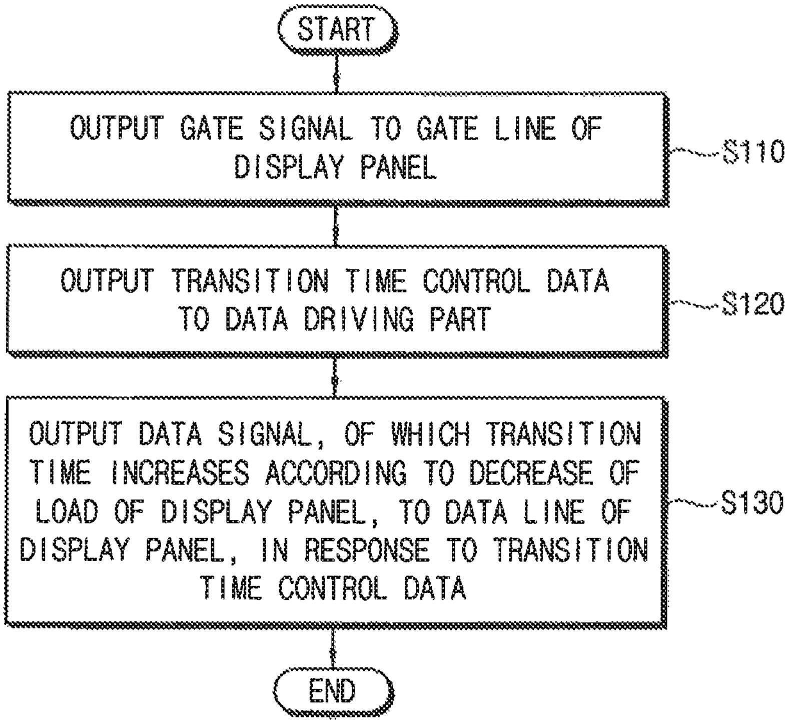
FIG. 6 is a flowchart illustrating a method of driving the display apparatus of FIG. 1 according to an exemplary embodiment of the present inventive concept.
Figure 7A:
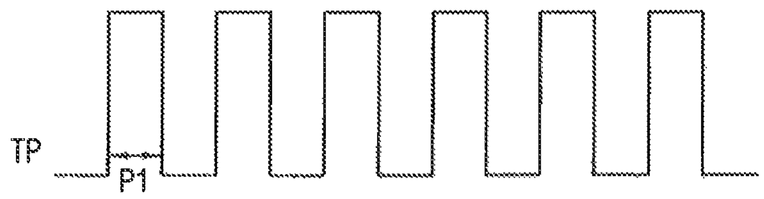
FIGS. 7A to 7D are timing diagrams illustrating a Transfer Pulse (TP) signal according to an exemplary embodiment of the present inventive concept.
Figure 7B:
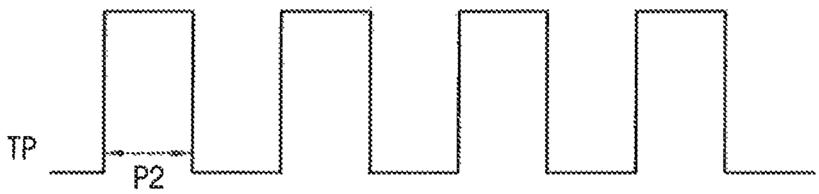
Figure 7C:
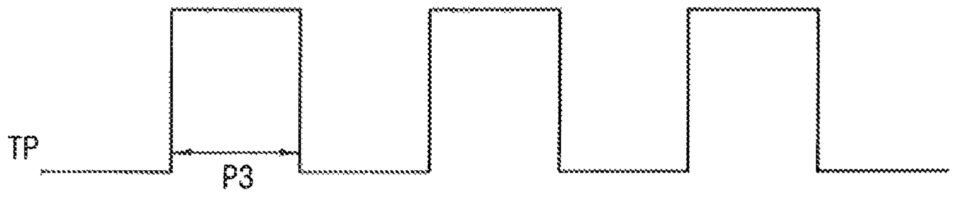
Figure 7D:
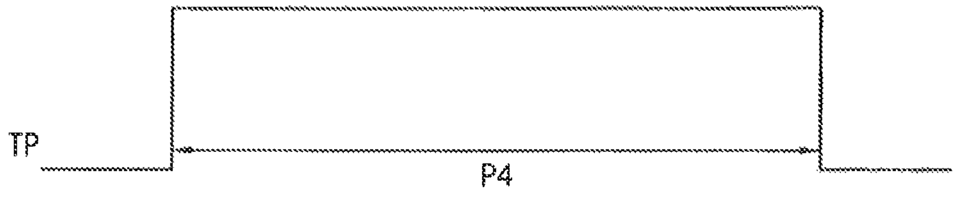

FIG. 6 is a flowchart illustrating a method of driving the display apparatus of FIG. 1 according to an exemplary embodiment of the present inventive concept.

Referring to FIGS. 1 and 3 to 6, the gate signals GS are output to the gate lines GL of the display panel 110 (operation S110). For example, the gate driving part 130 generates the gate signals GS in response to the first control signal CONT1 provided from the timing controlling part 150, and outputs the gate signals GS to the gate lines GL.

The transition time control data PWRC is output to the data driving part 140 (operation S120). For example, the timing controlling part 150 outputs the transition time control data PWRC, for controlling the transition time and the slew of the data signal DS, to the data driving part 140.

The data signal DS, of which the transition time increases according to the decrease of the load of the display panel 110, is output to the data lines DL of the display panel 110, in response to the transition time control data PWRC (operation S130).

For example, the data driving part 140 receives the image data DATA from the timing controlling part 150, generates the data signal DS based on the image data DATA, and outputs the data signal DS to the data lines DL in response to the second control signal CONT2 provided from the timing controlling part 150.

The data driving part 140 receives the transition time control data PWRC from the timing controlling part 150.

As described above, the transition time of the data signal DS output from the data driving part 140 and applied to the first display area DA1 may be the first time T1. The first time T1 may be controlled by the first transition time control data PWRC1.

The transition time of the data signal DS output from the data driving part 140 and applied to the second display area DA2 may be the second time T2. The second time T2 is shorter than the first time T1. Thus, the slew of the data signal DS output from the data driving part 140 and applied to the second display area DA2 is greater than that of the data signal DS output from the data driving part 140 and applied to the first display area DA1. The second time T2 may be controlled by the second transition time control data PWRC2.

The transition time of the data signal DS output from the data driving part 140 and applied to the third display area DA3 may be the third time T3. The third time T3 is shorter than the second time T2. Thus, the slew of the data signal DS output from the data driving part 140 and applied to the third display area DA3 is greater than that of the data signal DS output from the data driving part 140 and applied to the second display area DA2. The third time T3 may be controlled by the third transition time control data PWRC3.

The transition time of the data signal DS output from the data driving part 140 and applied to the fourth display area DA4 may be the fourth time T4. The fourth time T4 is shorter than the third time T3. Thus, the slew of the data signal DS output from the data driving part 140 and applied to the fourth display area DA4 is greater than that of the data signal DS output from the data driving part 140 and applied to the third display area DA3. The fourth time T4 may be controlled by the fourth transition time control data PWRC4.

According to the present exemplary embodiment, the transition time of the data signal DS output from the data driving part 140 and applied to the first display area DA1 is the first time T1, the transition time of the data signal DS output from the data driving part 140 and applied to the second display area DA2 is the second time T2 that is shorter than the first time T1, the transition time of the data signal DS output from the data driving part 140 and applied to the third display area DA3 is the third time T3 that is shorter than the second time T2, and the transition time of the data signal DS output from the data driving part 140 and applied to the fourth display area DA4 is the fourth time T4 that is shorter than the third time T3.

Therefore, the transition time of the data signal DS at the data lines DL in the first display area DA1, the transition time of the data signal DS at the data lines DL in the second display area DA2, the transition time of the data signal DS at the data lines DL in the third display area DA3, and the transition time of the data signal DS at the data lines DL in the fourth display area DA4 are substantially the same. Thus, the pixel data charge rate in the first display area DA1, the second display area DA2, the third display area DA3, and the fourth display area DA4 may be substantially the same.

In addition, the first time T1, the second time T2, the third time T3, and the fourth time T4 may be controlled based on the transition time of the data signal DS at the data lines DL in the fourth display area DA4. The transition time of the data signal DS at the data lines DL of the fourth display area DA4 is longer than each of the transition time of the data signal DS at the data lines DL of the first display area DA1, the transition time of the data signal DS at the data lines DL of the second display area DA2, and the transition time of the data signal DS at the data lines DL of the third display area DA3. Therefore, heat and power consumption of the data driving part 140 may be decreased, and a Conducted Emission (CE) noise of a power supplying part that supplies power to drive the display apparatus 100 may be decreased.

Thus, display quality of the display apparatus 100 may be increased.

FIGS. 7A to 7D are timing diagrams illustrating a Transfer Pulse (TP) signal according to an exemplary embodiment of the present inventive concept.

A TP signal TP, according to the present exemplary embodiment illustrated in FIGS. 7A to 7D, may be included in the second control signal CONT2 output from the timing controlling part 150 to the data driving part 140, as described with reference to FIG. 1. Thus, the same reference numerals will be used to refer to the same or like parts as those described previously, and repeat explanations concerning these elements will be omitted.

Referring to FIGS. 1, 3, and 7A to 7D, a high period of the TP signal TP for controlling an output timing of the data signal DS output from the data driving part 140 and applied to the first display area DA1 has a first period P1. A high period of the TP signal TP for controlling an output timing of the data signal DS output from the data driving part 140 and applied to the second display area DA2 has a second period P2. The second period P2 is longer than the first period P1. A high period of the TP signal TP for controlling an output timing of the data signal DS output from the data driving part 140 and applied to the third display area DA3 has a third period P3. The third period P3 is longer than the second period P2. A high period of the TP signal TP for controlling an output timing of the data signal DS output from the data driving part 140 and applied to the fourth display area DA4 has a fourth period P4. The fourth period P4 is longer than the third period P3.

When the display panel 110 includes the first to N-th display areas, high periods of the TP signal TP for controlling output timings of the data signal DS, output from the data driving part 140 and applied to first to N-th display areas, may be first to N-th periods. The first to N-th periods may sequentially increase.

FIG. 8 illustrates a lookup table storing TP control data for controlling the TP signal of FIGS. 7A to 7D according to an exemplary embodiment of the present inventive concept.

Referring to FIGS. 1, 3, 4, and 7A to 8, a lookup table 260 may store the first transition time control data PWRC1, the second transition time control data PWRC2, the third transition time control data PWRC3, and the fourth transition time control data PWRC4 corresponding to the first display area DA1, the second display area DA2, the third display area DA3, and the fourth display area DA4, respectively.

In addition, the lookup table 260 may store TP signal control data TPC corresponding to lines LINE of the display panel 110. Here, the lines LINE may be the gate lines GL, which are horizontal lines substantially parallel to the short side of the display panel 110 as illustrated in FIG. 1.

The first display area DA1 may include first to h-th lines LINE1, LINE2, . . . , LINEh.

The second display area DA2 may include (h+1)-th to i-th lines LINE(h+1), LINE(h+2), . . . , LINEi. The third display area DA3 may include (i+1)-th to j-th lines LINE(i+1), LINE(i+2), . . . , LINEj. The fourth display area DA4 may include (j+1)-th to k-th lines LINE(j+1), LINE(j+2), . . . , LINEk.

The TP signal control data TPC may include first to h-th TP signal control data TPC1, TPC2, . . . , TPCh corresponding to the first to h-th lines LINE1, LINE2, . . . , LINEh of the first display area DA1, respectively. The TP signal control data TPC may include (h+1)-th to i-th TP signal control data TPC(h+1), TPC(h+2), . . . , TPCi corresponding to the (h+1)-th to i-th lines LINE(h+1), LINE(h+2), . . . , LINEi of the second display area DA2, respectively. The TP signal control data TPC may include (i+1)-th to j-th TP signal control data TPC(i+1), TPC(i+2), . . . , TPCj corresponding to the (i+1)-th to j-th lines LINE(i+1), LINE(i+2), . . . , LINEj of the third display area DA3, respectively. The TP signal control data TPC may include (j+1)-th to k-th TP signal control data TPC(j+1), TPC(j+2), . . . , and TPCk corresponding to the (j+1)-th to k-th lines LINE(j+1), LINE(j+2), . . . , LINEk of the fourth display area DA4, respectively.

Each high period of the TP signal TP controlled by the first to h-th TP signal control data TPC1, TPC2, . . . , TPCh of the first display area DA1 may be the first period P1. Each high period of the TP signal TP controlled by the (h+1)-th to i-th TP signal control data TPC(h+1), TPC(h+2), . . . , TPCi of the second display area DA2 may be the second period P2. Each high period of the TP signal TP controlled by the (i+1)-th to j-th TP signal control data TPC(i+1), TPC(i+2), . . . , TPCj of the third display area DA3 may be the third period P3. Each high period of the TP signal TP controlled by the (j+1)-th to k-th TP signal control data TPC(j+1), TPC(j+2), . . . , and TPCk of the fourth display area DA4 may be the fourth period P4.

Figure 9:
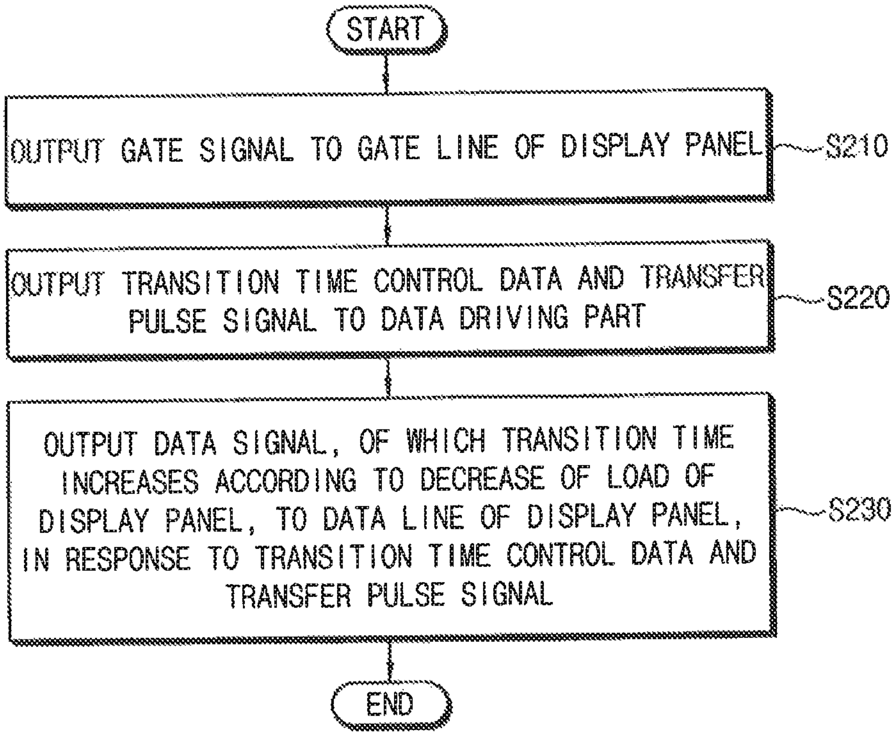
FIG. 9 is a flowchart illustrating a method of driving the display apparatus including the data driving part of FIG. 1 that receives the TP signal of FIGS. 7A to 7D according to an exemplary embodiment of the present inventive concept.

FIG. 9 is a flowchart illustrating a method of driving the display apparatus including the data driving part of FIG. 1 that receives the TP signal of FIGS. 7A to 7D according to an exemplary embodiment of the present inventive concept.

Referring to FIGS. 1, 3, 5A to 5D, and 7A to 9, the gate signals GS are output to the gate lines GL of the display panel 110 (operation S210). For example, the gate driving part 130 generates the gate signals GS in response to the first control signal CONT1 provided from the timing controlling part 150, and outputs the gate signals GS to the gate lines GL.

The transition time control data PWRC and the TP signal TP are output to the data driving part 140 (operation S220).

For example, the timing controlling part 150 outputs the transition time control data PWRC, for controlling the transition time and the slew of the data signal DS, to the data driving part 140.

In addition, the timing controlling part 150 outputs the TP signal TP, for controlling the output timing of the data signal DS, to the data driving part 140.

As described above, the high period of the TP signal TP for controlling the output timing of the data signal DS output from the data driving part 140 and applied to the first display area DA1 has the first period P1. The high period of the TP signal TP for controlling the output timing of the data signal DS output from the data driving part 140 and applied to the second display area DA2 has the second period P2. The second period P2 is longer than the first period P1. The high period of the TP signal TP for controlling the output timing of the data signal DS output from the data driving part 140 and applied to the third display area DA3 has the third period P3. The third period P3 is longer than the second period P2. The high period of the TP signal TP for controlling the output timing of the data signal DS output from the data driving part 140 and applied to the fourth display area DA4 has the fourth period P4. The fourth period P4 is longer than the third period P3.

The data signal DS, of which the transition time increases according to the decrease of the load of the display panel 110, is output to the data lines DL of the display panel 110 in response to the transition time control data PWRC and the TP signal TP (operation S230).

For example, the data driving part 140 receives the image data DATA from the timing controlling part 150, generates the data signal DS based on the image data DATA, and outputs the data signal DS to the data lines DL in response to the second control signal CONT2 provided from the timing controlling part 150. The second control signal CONT2 may include the TP signal TP.

The data driving part 140 receives the transition time control data PWRC from the timing controlling part 150.

The transition time of the data signal DS output from the data driving part 140 and applied to the first display area DA1 may be the first time T1. The first time T1 may be controlled by the first transition time control data PWRC1.

The transition time of the data signal DS output from the data driving part 140 and applied to the second display area DA2 may be the second time T2. The second time T2 is shorter than the first time T1. Thus, the slew of the data signal DS output from the data driving part 140 and applied to the second display area DA2 is greater than that of the data signal DS output from the data driving part 140 and applied to the first display area DA1. The second time T2 may be controlled by the second transition time control data PWRC2.

The transition time of the data signal DS output from the data driving part 140 and applied to the third display area DA3 may be the third time T3. The third time T3 is shorter than the second time T2. Thus, the slew of the data signal DS output from the data driving part 140 and applied to the third display area DA3 is greater than that of the data signal DS output from the data driving part 140 and applied to the second display area DA2. The third time T3 may be controlled by the third transition time control data PWRC3.

The transition time of the data signal DS output from the data driving part 140 and applied to the fourth display area DA4 may be the fourth time T4. The fourth time T4 is shorter than the third time T3. Thus, the slew of the data signal DS output from the data driving part 140 and applied to the fourth display area DA4 is greater than that of the data signal DS output from the data driving part 140 and applied to the third display area DA3. The fourth time T4 may be controlled by the fourth transition time control data PWRC4.

According to the present exemplary embodiment, the high period of the TP signal TP for controlling the output timing of the data signal DS applied to the first display area DA1 is the first period P1, the high period of the TP signal TP for controlling the output timing of the data signal DS applied to the second display area DA2 is the second period P2 that is longer than the first period P1, the high period of the TP signal TP for controlling the output timing of the data signal DS applied to the third display area DA3 is the third period P3 that is longer than the second period P2, and the high period of the TP signal TP for controlling the output timing of the data signal DS applied to the fourth display area DA4 is the fourth period P4 that is longer than the third period P3. Therefore, the transition time and the slew of the data signal DS may be gradually controlled. In addition, the transition time and the slew of the data signal DS may be non-linearly controlled.

Figure 10:
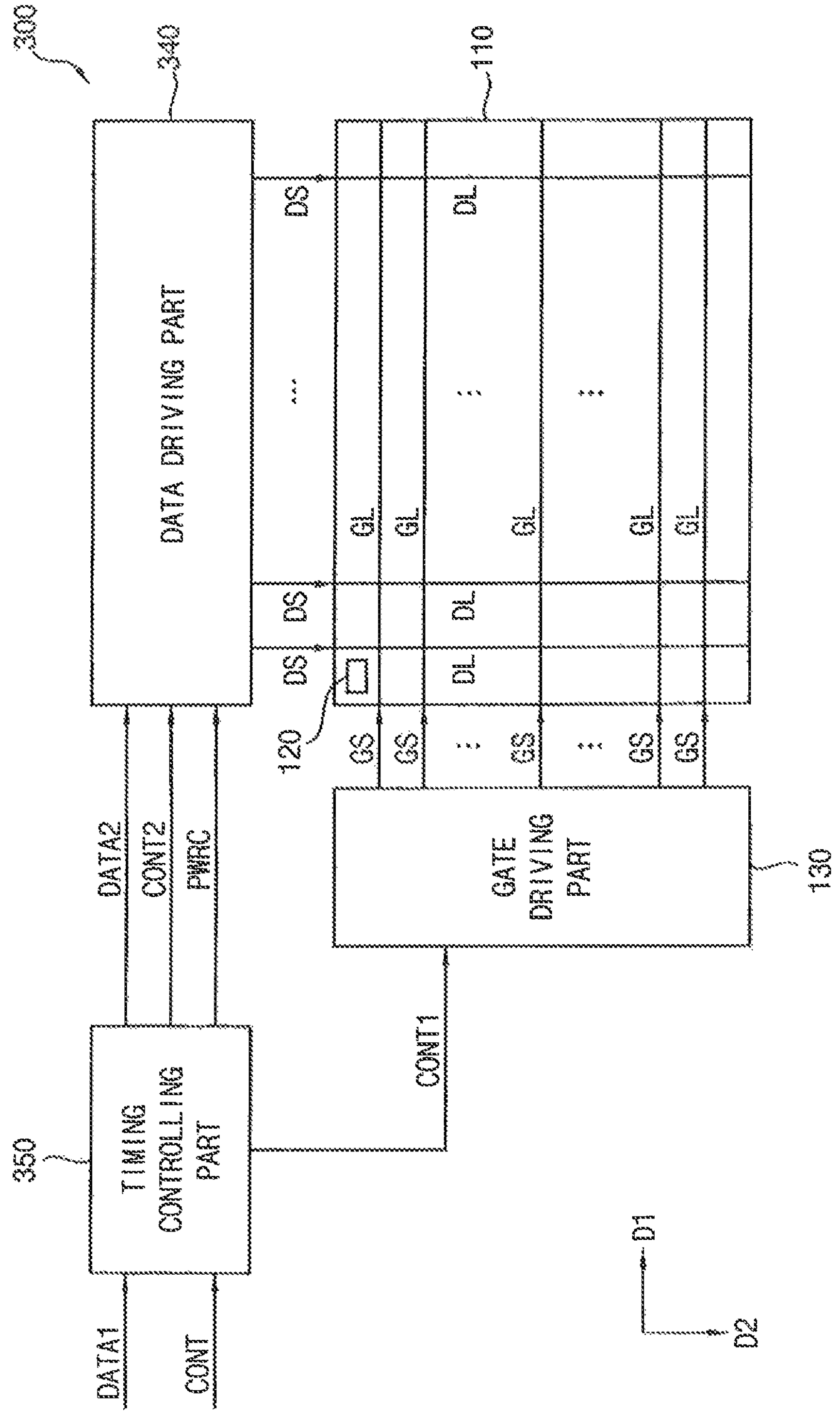
FIG. 10 is a block diagram illustrating a display apparatus according to an exemplary embodiment of the present inventive concept.

FIG. 10 is a block diagram illustrating a display apparatus according to an exemplary embodiment of the present inventive concept.

A display apparatus 300 illustrated in FIG. 10 is substantially the same as the display apparatus 100 illustrated in FIG. 1, except for a data driving part 340 and a timing controlling part 350. Thus, the same reference numerals will be used to refer to the same or like parts as those described previously, and repeat explanations concerning these elements will be omitted.

Referring to FIG. 10, the display apparatus 300 includes the display panel 110, the gate driving part 130, the data driving part 340, and the timing controlling part 350.

The display panel 110 receives the data signal DS from the data driving part 340 to display an image.

The gate driving part 130, the data driving part 340, and the timing controlling part 350 may be a display panel driving apparatus for driving the display panel 110.

The gate driving part 130 generates the gate signals GS in response to the first control signal CONT1 provided from the timing controlling part 350, and outputs the gate signals GS to the gate lines GL.

The data driving part 340 receives second image data DATA2, which is generated by applying luminance offset data to first image data DATA1, from the timing controlling part 350. The data driving part 340 generates the data signal DS based on the second image data DATA2, and outputs the data signal DS to the data lines DL in response to the second control signal CONT2 provided from the timing controlling part 350.

The timing controlling part 350 receives the first image data DATA1 and the control signal CON from an outside source (e.g., a host). The timing controlling part 350 generates the first control signal CONT1 using the control signal CON and outputs the first control signal CONT1 to the gate driving part 130. In addition, the timing controlling part 350 generates the second control signal CONT2 using the control signal CON and outputs the second control signal CONT2 to the data driving part 340.

In addition, the timing controlling part 350 outputs the transition time control data PWRC, for controlling the transition time and the slew of the data signal DS, to the data driving part 340.

FIG. 11 illustrates a lookup table storing the luminance offset data in second image data of FIG. 10 according to an exemplary embodiment of the present inventive concept.

Referring to FIGS. 3, 10, and 11, a lookup table 360 may store the first transition time control data PWRC1, the second transition time control data PWRC2, the third transition time control data PWRC3, and the fourth transition time control data PWRC4 corresponding to the first display area DA1, the second display area DA2, the third display area DA3, and the fourth display area DA4, respectively.

In addition, the lookup table 360 may store the TP signal control data TPC corresponding to the lines LINE of the display panel 110. For example, the TP signal control data TPC may include the first to h-th TP signal control data TPC1, TPC2, . . . , TPCh corresponding to the first to h-th lines LINE1, LINE2, . . . , LINEh of the first display area DA1, respectively. The TP signal control data TPC may include the (h+1)-th to i-th TP signal control data TPC(h+1), TPC(h+2), . . . , TPCi corresponding to the (h+1)-th to i-th lines LINE(h+1), LINE(h+2), . . . , LINEi of the second display area DA2, respectively. The TP signal control data TPC may include the (i+1)-th to j-th TP signal control data TPC(i+1), TPC(i+2), . . . , TPCj corresponding to the (i+1)-th to j-th lines LINE(i+1), LINE(i+2), . . . , LINEj of the third display area DA3, respectively. The TP signal control data TPC may include the (j+1)-th to k-th TP signal control data TPC(j+1), TPC(j+2), . . . , and TPCk corresponding to the (j+1)-th to k-th lines LINE(j+1), LINE(j+2), . . . , LINEk of the fourth display area DA4, respectively.

In addition, the lookup table 360 may store luminance offset data LOD. For example, the lookup table 360 may store first luminance offset data LOD1, second luminance offset data LOD2, third luminance offset data LOD3, and fourth luminance offset data LOD4 corresponding to the first display area DA1, the second display area DA2, the third display area DA3, and the fourth display area DA4, respectively.

When the display panel 110 includes the first to N-th display areas, the luminance offset data LOD may include first to N-th luminance offset data corresponding to the first to N-th display areas, respectively.

The lookup table 360 may be included in the timing controlling part 350 of FIG. 10. The timing controlling part 350 applies the luminance offset data LOD to the first image data DATA1 to output the second image data DATA2.

Figure 12:
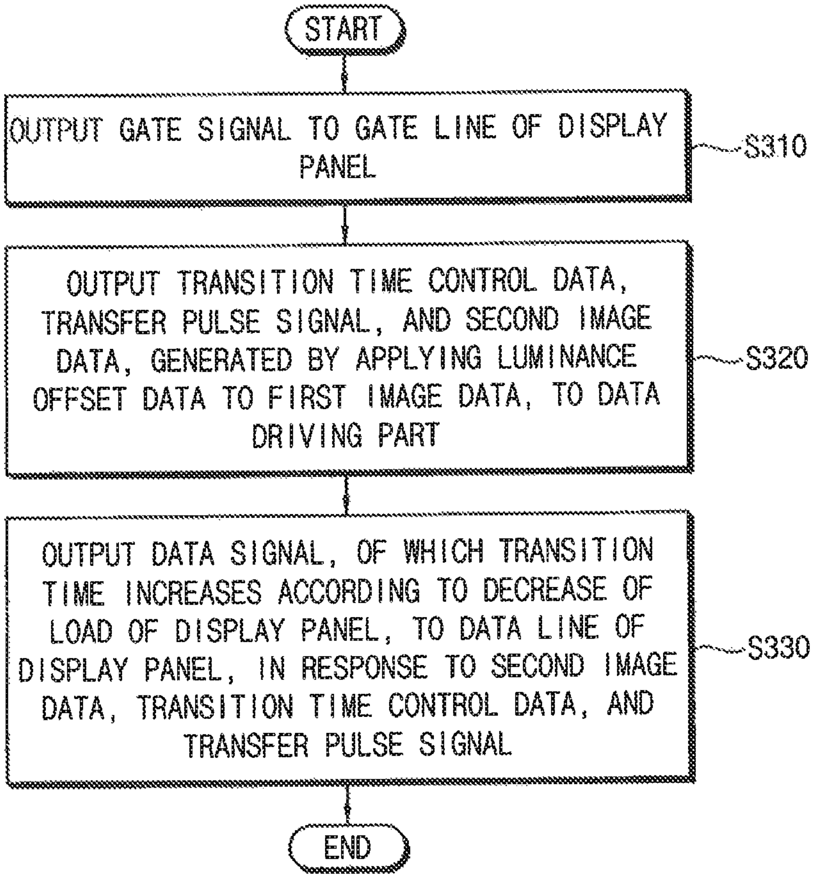
FIG. 12 is a flowchart illustrating a method of driving the display apparatus of FIG. 10 according to an exemplary embodiment of the present inventive concept.

FIG. 12 is a flowchart illustrating a method of driving the display apparatus of FIG. 10 according to an exemplary embodiment of the present inventive concept.

Referring to FIGS. 3, 5A to 5D, 7A to 7D, and 10 to 12, the gate signals GS are output to the gate lines GL of the display panel 110 (operation S310). For example, the gate driving part 130 generates the gate signals GS in response to the first control signal CONT1 provided from the timing controlling part 350, and outputs the gate signals GS to the gate lines GL.

The transition time control data PWRC, the TP signal TP, and the second image data DATA2 (generated by applying the luminance offset data LOD to the first image data DATA1) are output to the data driving part 340 (operation S320).

For example, the timing controlling part 350 generates and outputs the second image data DATA2 by applying the luminance offset data LOD to the first image data DATA1. The luminance offset data LOD may include the first luminance offset data LOD1, the second luminance offset data LOD2, the third luminance offset data LOD3, and the fourth luminance offset data LOD4 corresponding to the first display area DA1, the second display area DA2, the third display area DA3, and the fourth display area DA4, respectively.

For example, the timing controlling part 350 outputs the transition time control data PWRC, for controlling the transition time and the slew of the data signal DS, to the data driving part 340.

In addition, the timing controlling part 350 outputs the TP signal TP, for controlling the output timing of the data signal DS, to the data driving part 340.

The data signal DS, of which the transition time increases according to the decrease of the load of the display panel 110, is output to the data lines DL of the display panel 110 in response to the second image data DATA2, the transition time control data PWRC, and the TP signal TP (operation S330).

For example, the data driving part 340 receives the second image data DATA2 from the timing controlling part 350, generates the data signal DS based on the second image data DATA2, and outputs the data signal DS to the data lines DL in response to the second control signal CONT2 provided from the timing controlling part 350. The second control signal CONT2 may include the TP signal TP.

The data driving part 340 receives the transition time control data PWRC from the timing controlling part 350.

The transition time of the data signal DS output from the data driving part 340 and applied to the first display area DA1 may be the first time T1. The first time T1 may be controlled by the first transition time control data PWRC1.

The transition time of the data signal DS output from the data driving part 340 and applied to the second display area DA2 may be the second time T2. The second time T2 is shorter than the first time T1. Thus, the slew of the data signal DS output from the data driving part 340 and applied to the second display area DA2 is greater than that of the data signal DS output from the data driving part 340 and applied to the first display area DA1. The second time T2 may be controlled by the second transition time control data PWRC2.

The transition time of the data signal DS output from the data driving part 340 and applied to the third display area DA3 may be the third time T3. The third time T3 is shorter than the second time T2. Thus, the slew of the data signal DS output from the data driving part 340 and applied to the third display area DA3 is greater than that of the data signal DS output from the data driving part 340 and applied to the second display area DA2. The third time T3 may be controlled by the third transition time control data PWRC3.

The transition time of the data signal DS output from the data driving part 340 and applied to the fourth display area DA4 may be the fourth time T4. The fourth time T4 is shorter than the third time T3. Thus, the slew of the data signal DS output from the data driving part 340 and applied to the fourth display area DA4 is greater than that of the data signal DS output from the data driving part 340 and applied to the third display area DA3. The fourth time T4 may be controlled by the fourth transition time control data PWRC4.

According to the present exemplary embodiment, the second image data DATA2 is generated by applying the first luminance offset data LOD1, the second luminance offset data LOD2, the third luminance offset data LOD3, and the fourth luminance offset data LOD4, which correspond to the first display area DA1, the second display area DA2, the third display area DA3, and the fourth display area DA4, respectively, to the first image data DATA1. The timing controlling part 350 outputs the second image data DATA2 to the data driving part 340. The data driving part 340 generates the data signal DS based on the second image data DATA2, and outputs the data signal DS to the data lines DL of the display panel 110. Therefore, linearity and smoothness of the image displayed on the display panel 110 may be increased at boundary areas of the first display area DA1, the second display area DA2, the third display area DA3, and the fourth display area DA4.

Thus, display quality of the display apparatus 300 may be increased.

Figure 13:
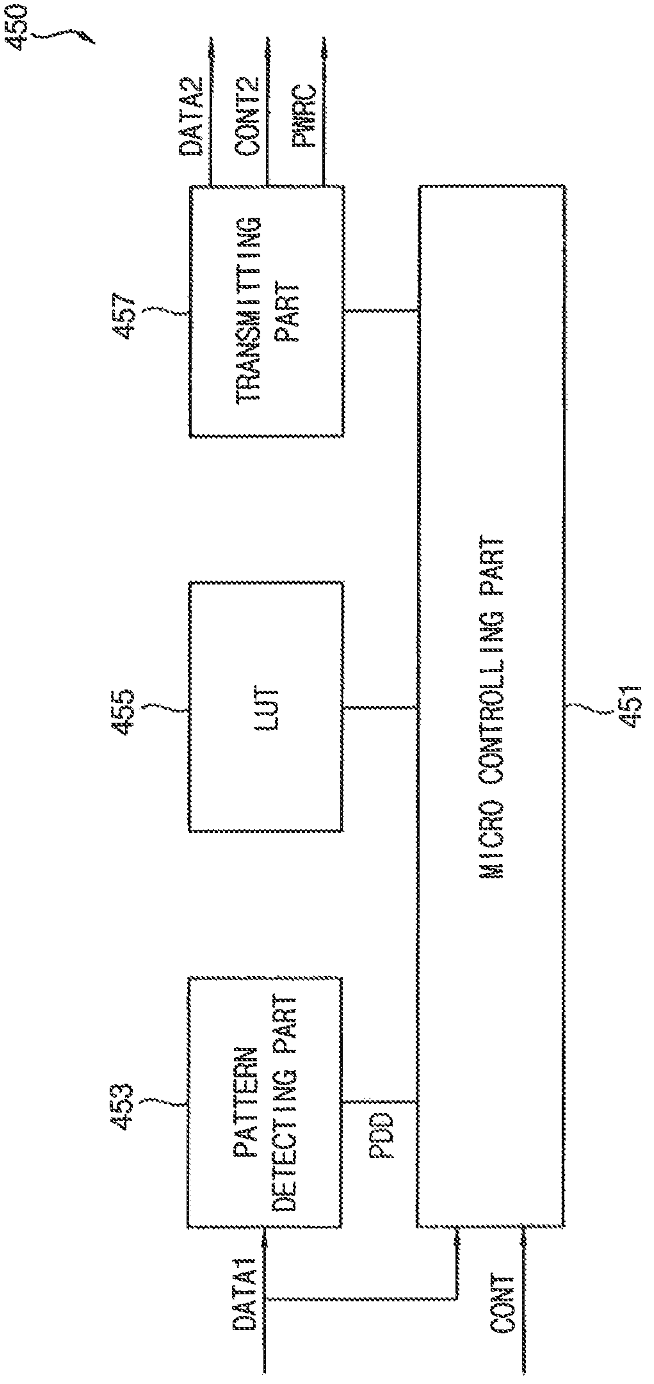
FIG. 13 is a block diagram illustrating a timing controlling part according to an exemplary embodiment of the present inventive concept.

FIG. 13 is a block diagram illustrating a timing controlling part according to an exemplary embodiment of the present inventive concept.

A timing controlling part 450 illustrated in FIG. 13 may be included in the display apparatus 300 illustrated in FIG. 10, and may replace the timing controlling part 350. Thus, the same reference numerals will be used to refer to the same or like parts as those described previously, and repeat explanations concerning these elements will be omitted.

Referring to FIGS. 10, 11, and 13, the timing controlling part 450 includes a micro controlling part 451, a pattern detecting part 453, a lookup table 455, and a transmitting part 457.

The micro controlling part 451 controls overall operations of the pattern detecting part 453, the lookup table 455, and the transmitting part 457. The micro controlling part 451 transfers a signal and data between at least two of the pattern detecting part 453, the lookup table 455, and the transmitting part 457. The micro controlling part 451 receives the first image data DATA1, applies the luminance offset data LOD to the first image data DATA1, and outputs the second image data DATA2 to the data driving part 340 through the transmitting part 457. The micro controlling part 451 receives the control signal CONT, applies the TP signal control data TPC to the control signal CONT, and outputs the second control signal CONT2 to the data driving part 340 through the transmitting part 457.

The pattern detecting part 453 receives the first image data DATA1, detects a pattern of the first image data DATA1, and outputs pattern detection data PDD to the micro controlling part 451.

The lookup table 455 may store the transition time control data PWRC, the TP signal control data TPC, and the luminance offset data LOD. The lookup table 455 may be substantially the same as the lookup table 360 illustrated in FIG. 11.

The transmitting part 457 outputs the second image data DATA2, the second control signal CONT2, and the transition time control data PWRC to the data driving part 340.

Figure 14A:
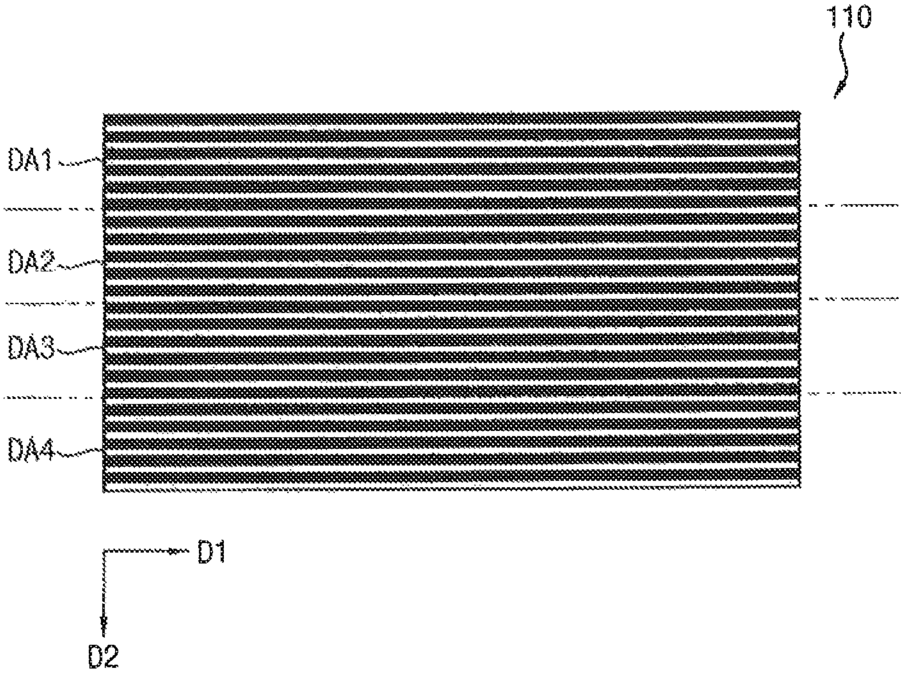
FIG. 14A is a plan view illustrating a display panel of FIG. 10 displaying a first image pattern according to an exemplary embodiment of the present inventive concept.

FIG. 14A is a plan view illustrating a display panel of FIG. 10 displaying a first image pattern according to an exemplary embodiment of the present inventive concept.

Referring to FIG. 14A, the display panel 110 may include the first display area DA1, the second display area DA2, the third display area DA3, and the fourth display area DA4. The display panel 110 may display the first image pattern in each of the first display area DA1, the second display area DA2, the third display area DA3, and the fourth display area DA4. The first image pattern may be a toggle pattern. For example, the first image pattern may be an image pattern alternately including a white image and a black image in the second direction D2.

Figure 14B:
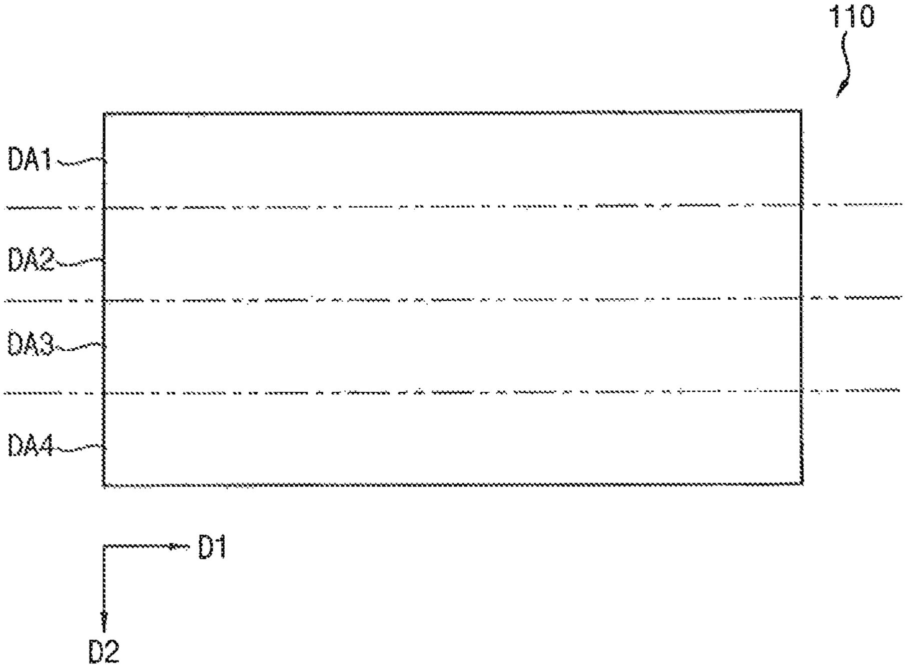
FIG. 14B is a plan view illustrating the display panel of FIG. 10 displaying a second image pattern that is different from the first image pattern according to an exemplary embodiment of the present inventive concept.

FIG. 14B is a plan view illustrating the display panel of FIG. 10 displaying a second image pattern that is different from the first image pattern according to an exemplary embodiment of the present inventive concept.

Referring to FIG. 14B, the display panel 110 may display the second image pattern in a whole area of the display panel 110. The second image pattern may be a direct current pattern. For example, the second image pattern may be a full white image.

Figure 14C:
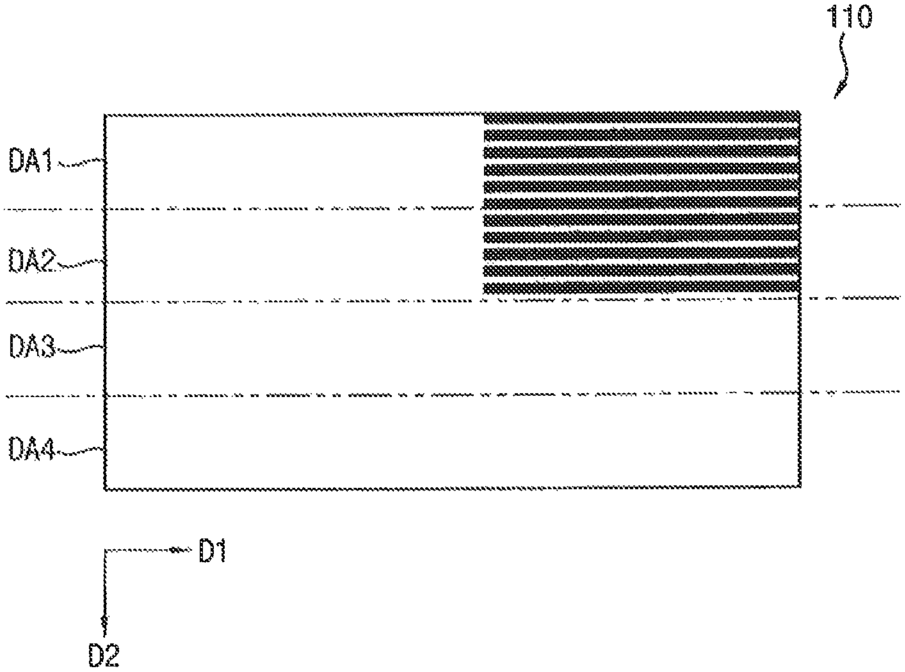
FIG. 14C is a plan view illustrating the display panel of FIG. 10 displaying the first image pattern and the second image pattern according to an exemplary embodiment of the present inventive concept.

FIG. 14C is a plan view illustrating the display panel of FIG. 10 displaying the first image pattern and the second image pattern according to an exemplary embodiment of the present inventive concept.

Referring to FIG. 14C, the display panel 110 may display the first image pattern and the second image pattern. The first image pattern may be the toggle pattern, and the second image pattern may be the direct current pattern. For example, the toggle pattern may be displayed in a portion of the first display area DA1 and a portion of the second display area DA2. The direct current pattern may be displayed in a remaining portion of the display panel 110 that is not displaying the toggle pattern.

Referring to FIGS. 10, 11, and 13 again, the pattern detecting part 453 determines whether the first image data DATA1 is the toggle pattern or the direct current pattern, and outputs the pattern detection data PDD.

When the first image data DATA1 is the toggle pattern, the timing controlling part 450 of FIG. 13 operates substantially the same as the timing controlling part 350 of FIG. 10.

For example, the timing controlling part 450 outputs the transition time control data PWRC to the data driving part 340. As described above, the transition time control data PWRC includes the first transition time control data PWRC1, the second transition time control data PWRC2, the third transition time control data PWRC3, and the fourth transition time control data PWRC4 corresponding to the first display area DA1, the second display area DA2, the third display area DA3, and the fourth display area DA4, respectively.

In addition, the timing controlling part 450 outputs the second control signal CONT2 including the TP signal TP controlled according to the first to k-th TP signal control data TPC1 to TPCk. As described above, the first to h-th TP signal control data TPC1, TPC2, . . . , TPCh corresponds to the first to h-th lines LINE1, LINE2, . . . , LINEh of the first display area DA1, respectively. The (h+1)-th to i-th TP signal control data TPC(h+1), TPC(h+2), . . . , TPCi correspond to the (h+1)-th to i-th lines LINE(h+1), LINE(h+2), . . . , LINEi of the second display area DA2, respectively. The (i+1)-th to j-th TP signal control data TPC(i+1), TPC(i+2), . . . , TPCj correspond to the (i+1)-th to j-th lines LINE(i+1), LINE(i+2), . . . , LINEj of the third display area DA3, respectively. The (j+1)-th to k-th TP signal control data TPC(j+1), TPC(j+2), . . . , and TPCk correspond to the (j+1)-th to k-th lines LINE(j+1), LINE(j+2), . . . , LINEk of the fourth display area DA4, respectively.

In addition, the timing controlling part 450 outputs the second image data DATA2 to the data driving part 340 by applying the luminance offset data LOD to the first image data DATA1. The luminance offset data LOD includes the first luminance offset data LOD1, the second luminance offset data LOD2, the third luminance offset data LOD3, and the fourth luminance offset data LOD4 corresponding to the first display area DA1, the second display area DA2, the third display area DA3, and the fourth display area DA4, respectively.

When the first image data DATA1 is the direct current pattern, the timing controlling part 450 outputs the first transition time control data PWRC1 as the transition time control data PWRC to the data driving part 340, without a division into the first display area DA1, the second display area DA2, the third display area DA3, and the fourth display area DA4.

In addition, the timing controlling part 450 outputs the second control signal CONT2, including the TP signal TP controlled by at least one of the first to h-th TP signal control data TPC1, TPC2, . . . , TPCh, to the data driving part 340, without the division into the first display area DA1, the second display area DA2, the third display area DA3, and the fourth display area DA4. Here, the high period of the TP signal TP has the first period P1.

Furthermore, the timing controlling part 450 applies the first luminance offset data LOD1, as the luminance offset data LOD, to the first image data DATA1 to output the second image data DATA2 to the data driving part 340, without the division into the first display area DA1, the second display area DA2, the third display area DA3, and the fourth display area DA4.

In other words, when the first image data DATA1 is the direct current pattern, parameters corresponding to the first display area DA1 may be used, e.g., the first transition time control data PWRC1, the first to h-th TP signal control data TPC1 to TPCh, and the first luminance offset data LOD1.

When the first image data DATA1 includes both the first image pattern (e.g., the toggle pattern) and the second image pattern (e.g., the direct current pattern), the timing controlling part 450 and the data driving part 340 may perform an operation on a display area where the first image pattern is displayed, similar to the operation described above in which the first image data DATA1 is the first image pattern, and may perform an operation on a display area where the second image pattern is displayed, similar to the operation described above in which the first image data DATA1 is the second image pattern.

Figure 15:
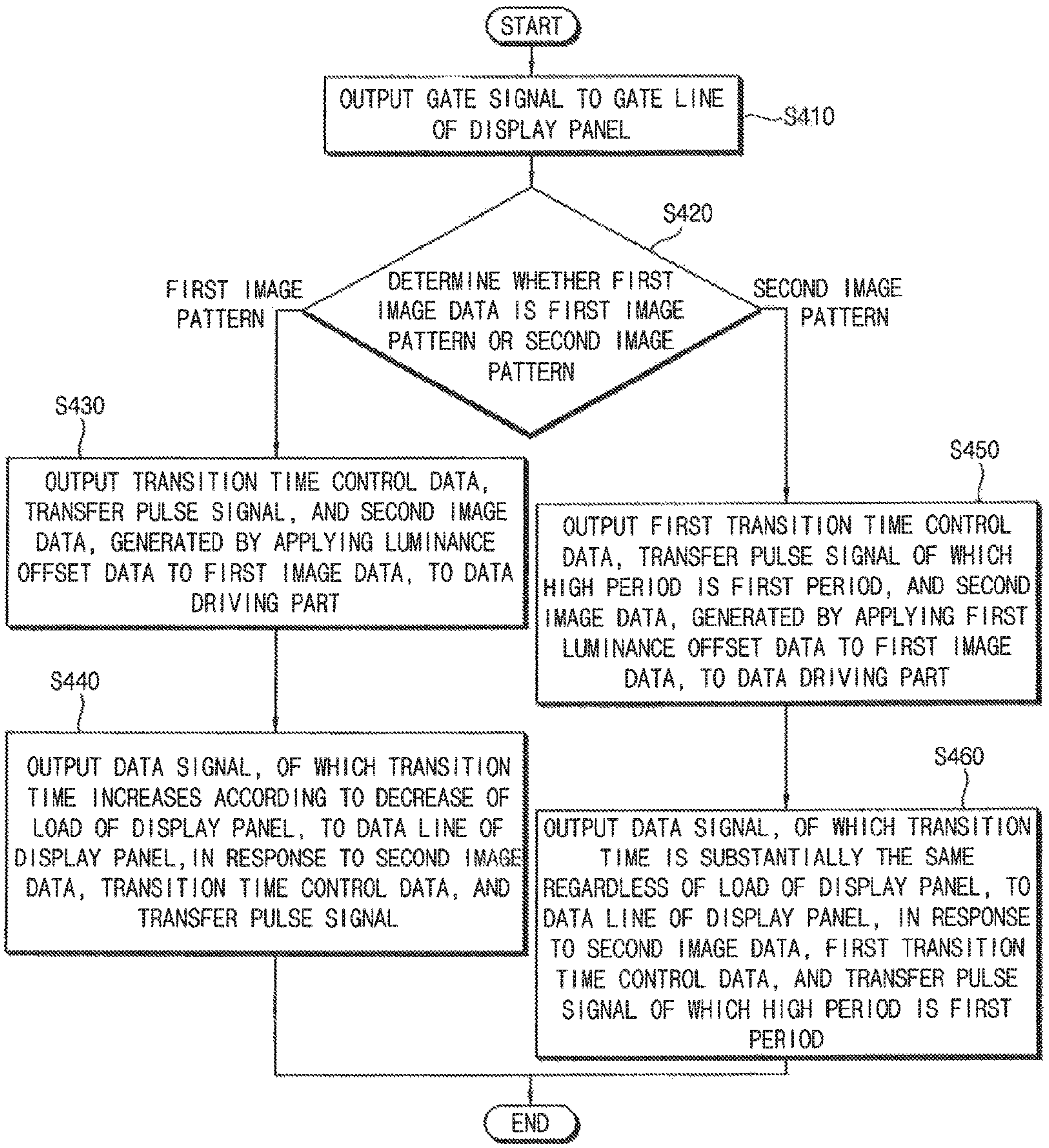
FIG. 15 is a flowchart illustrating a method of driving the display apparatus of FIG. 10 including the timing controlling part of FIG. 13 according to an exemplary embodiment of the present inventive concept.

FIG. 15 is a flowchart illustrating a method of driving the display apparatus of FIG. 10 including the timing controlling part of FIG. 13 according to an exemplary embodiment of the present inventive concept.

Referring to FIGS. 5A to 5D, 7A to 7D, 10, 11, and 13 to 15, the gate signals GS are output to the gate lines GL of the display panel 110 (operation S410). For example, the gate driving part 130 generates the gate signals GS in response to the first control signal CONT1 provided from the timing controlling part 450, and outputs the gate signals GS to the gate lines GL.

It is determined whether the first image data DATA1 is the first image pattern or the second image pattern (operation S420). For example, the pattern detecting part 453 of the timing controlling part 450 receives the first image data DATA1, and detects the pattern of the first image data DATA1 to output the pattern detection data PDD to the micro controlling part 451. The first image pattern may be the toggle pattern. The second image pattern may be the direct current pattern.

When the first image data DATA1 is the first image pattern, the transition time control data PWRC, the TP signal TP, and the second image data DATA2, which is generated by applying the luminance offset data LOD to the first image data DATA1, are output to the data driving part 340 (operation S430).

For example, the timing controlling part 450 outputs the second image data DATA2 to the data driving part 340 by applying the luminance offset data LOD to the first image data DATA1. As described above, the luminance offset data LOD includes the first luminance offset data LOD1, the second luminance offset data LOD2, the third luminance offset data LOD3, and the fourth luminance offset data LOD4 corresponding to the first display area DA1, the second display area DA2, the third display area DA3, and the fourth display area DA4, respectively.

In addition, the timing controlling part 450 outputs the transition time control data PWRC to the data driving part 340. The transition time control data PWRC includes the first transition time control data PWRC1, the second transition time control data PWRC2, the third transition time control data PWRC3, and the fourth transition time control data PWRC4 corresponding to the first display area DA1, the second display area DA2, the third display area DA3, and the fourth display area DA4, respectively.

Furthermore, the timing controlling part 450 outputs the second control signal CONT2 including the TP signal TP controlled according to the first to k-th TP signal control data TPC1 to TPCk. The first to h-th TP signal control data TPC1, TPC2, . . . , TPCh correspond to the first to h-th lines LINE1, LINE2, . . . , LINEh of the first display area DA1, respectively. The (h+1)-th to i-th TP signal control data TPC(h+1), TPC(h+2), . . . , TPCi correspond to the (h+1)-th to i-th lines LINE(h+1), LINE(h+2), . . . , LINEi of the second display area DA2, respectively. The (i+1)-th to j-th TP signal control data TPC(i+1), TPC(i+2), . . . , TPCj correspond to the (i+1)-th to j-th lines LINE(i+1), LINE(i+2), . . . , LINEj of the third display area DA3, respectively. The (j+1)-th to k-th TP signal control data TPC(j+1), TPC(j+2), . . . , and TPCk correspond to the (j+1)-th to k-th lines LINE(j+1), LINE(j+2), . . . , LINEk of the fourth display area DA4, respectively.

The data signal DS, of which the transition time increases according to the decrease of the load of the display panel 110, is output to the data lines DL of the display panel 110 in response to the second image data DATA2, the transition time control data PWRC, and the TP signal TP (operation S440).

For example, the data driving part 340 receives the second image data DATA2 from the timing controlling part 450, generates the data signal DS based on the second image data DATA2, and outputs the data signal DS to the data lines DL in response to the second control signal CONT2 provided from the timing controlling part 450. The second control signal CONT2 may include the TP signal TP.

The data driving part 340 receives the transition time control data PWRC from the timing controlling part 450.

The transition time of the data signal DS output from the data driving part 340 and applied to the first display area DA1 may be the first time T1. The first time T1 may be controlled by the first transition time control data PWRC1.

The transition time of the data signal DS output from the data driving part 340 and applied to the second display area DA2 may be the second time T2. The second time T2 is shorter than the first time T1. Thus, the slew of the data signal DS output from the data driving part 340 and applied to the second display area DA2 is greater than that of the data signal DS output from the data driving part 340 and applied to the first display area DA1. The second time T2 may be controlled by the second transition time control data PWRC2.

The transition time of the data signal DS output from the data driving part 340 and applied to the third display area DA3 may be the third time T3. The third time T3 is shorter than the second time T2. Thus, the slew of the data signal DS output from the data driving part 340 and applied to the third display area DA3 is greater than that of the data signal DS output from the data driving part 340 and applied to the second display area DA2. The third time T3 may be controlled by the third transition time control data PWRC3.

The transition time of the data signal DS output from the data driving part 340 and applied to the fourth display area DA4 may be the fourth time T4. The fourth time T4 is shorter than the third time T3. Thus, the slew of the data signal DS output from the data driving part 340 and applied to the fourth display area DA4 is greater than that of the data signal DS output from the data driving part 340 and applied to the third display area DA3. The fourth time T4 may be controlled by the fourth transition time control data PWRC4.

When the first image data DATA1 is the second image pattern, the first transition time data PWRC1, the TP signal of which the high period is the first period P1, and the second image data DATA2, which is generated by applying the first luminance offset data LOD1 to the first image data DATA1, are output to the data driving part 340 (operation S450).

For example, the timing controlling part 450 applies the first luminance offset data LOD1, as the luminance offset data LOD, to the first image data DATA1 to output the second image data DATA2 to the data driving part 340, without the division into the first display area DA1, the second display area DA2, the third display area DA3, and the fourth display area DA4.

In addition, the timing controlling part 450 outputs the first transition time control data PWRC1, as the transition time control data PWRC, to the data driving part 340, without the division into the first display area DA1, the second display area DA2, the third display area DA3, and the fourth display area DA4.

Furthermore, the timing controlling part 450 outputs the second control signal CONT2, including the TP signal TP controlled by at least one of the first to h-th TP signal control data TPC1, TPC2, . . . , TPCh (corresponding to the first to h-th lines LINE1, LINE2, . . . , and LINEh of the first display area DA1, respectively), to the data driving part 340, without the division into the first display area DA1, the second display area DA2, the third display area DA3, and the fourth display area DA4. Here, the high period of the TP signal TP has the first period P1.

The data signal DS, of which the transition time is substantially the same regardless of the load of the display panel 110, is output to the data lines DL of the display panel 110 in response to the second image data DATA2, the first transition time control data PWRC1, and the TP signal TP of which the high period is the first period P1 (operation S460).

For example, the data driving part 340 receives the second image data DATA2, generates the data signal DS based on the second image data DATA2, and outputs the data signal DS to the data lines DL in response to the second control signal CONT2 provided from the timing controlling part 450. The second control signal CONT2 may include the TP signal TP.

The data driving part 340 receives the first transition time control data PWRC1 from the timing controlling part 450. Each of the transition times of the data signals DS output from the data driving part 340 and applied to the first display area DA1, the second display area DA2, the third display area DA3, and the fourth display area DA4 may be the first time T1 (rather than the first to fourth times T1 to T4). These transition times may be controlled by the first transition time control data PWRC1.

Additionally, when the first image data DATA1 includes the first image pattern and the second image pattern, operation S430 and operation S440 may be performed on the display area where the first image pattern is displayed, and operation S450 and operation S460 may be performed on the display area where the second image pattern is displayed.

According to the present exemplary embodiment, when an image pattern displayed on the display panel 110 is the direct current pattern, the data signal DS, of which the transition time is the first time T1 regardless of the load of the display panel 110, is output to the data lines DL of the display panel 110. Therefore, heat and power consumption of the data driving part 340 and the display apparatus 300 including the data driving part 340 may be decreased.

The present inventive concept may be applied to any electronic device having a display apparatus, such as a television, a computer monitor, a laptop, a digital camera, a cellular phone, a smart phone, a tablet Personal Computer (PC), a smart pad, a Personal Digital Assistant (PDA), a Portable Multimedia Player (PMP), an MP3 player, a navigation system, a camcorder, a portable game console, etc.

As described above, according to exemplary embodiments of the present inventive concept, a pixel data charge rate in a display apparatus may be equalized. In addition, heat and power consumption of the display apparatus and a data driving part thereof may be decreased. Thus, display quality of the display apparatus may be increased.

While the present inventive concept has been shown and described with reference to exemplary embodiments thereof, it will be apparent to those of ordinary skill in the art that various modifications in form and details may be made thereto without materially departing from the spirit and scope of the present inventive concept as defined by the following claims.

What is claimed is:

1. A display apparatus comprising:

a display panel configured to display an image, and including a gate line and a data line;

a gate driving part configured to output a gate signal to the gate line; and a data driving part configured to output a data signal to the data line, wherein a transition time of the data signal is a time when the data signal transitions from a low level to a high level, the transition time of the data signal increases according to a decrease of a load of the display panel, the display panel sequentially comprises first to N-th (where N is a natural number not less than two) display areas in a direction in which the data line extends, the data driving part outputs the data signal in response to a transfer pulse signal for controlling an output timing of the data signal, a high period of the transfer pulse signal for controlling the output timing of the data signal applied to the first display area has a first period, and a high period of the transfer pulse signal for controlling the output timing of the data signal applied to the N-th display area has an N-th period that is longer than the first period.

2. The display apparatus of claim 1, wherein the transition time of the data signal, output from the data driving part and applied to the data line, increases as a distance between the data line and the data driving part decreases.

3. The display apparatus of claim 1, wherein the transition time of the data signal, output from the data driving part and applied to the data line, increases as a resistor-capacitor (RC) resistance of the data line decreases.

4. The display apparatus of claim 1, wherein the transition time of the data signal, output from the data driving part and applied to the first display area, has a first time, and the transition time of the data signal, output from the data driving part and applied to the N-th display area, has an N-th time that is shorter than the first time.

5. The display apparatus of claim 4, wherein transition times of the data signal, applied to the first to (N−1)-th display areas, are controlled using the transition time of the data signal applied to the N-th display area and delayed.

6. The display apparatus of claim 5, further comprising:

a lookup table configured to store transition time control data for controlling the transition times of the data signals applied to the first to N-th display areas.

7. The display apparatus of claim 1, further comprising:

a lookup table configured to store transfer pulse data for controlling the high period of the transfer pulse signal.

8. The display apparatus of claim 1, wherein the data driving part generates and outputs the data signal using image data to which luminance offset data, corresponding to the first to N-th display areas, is applied.

9. The display apparatus of claim 8, further comprising:

a lookup table configured to store the luminance offset data.

10. The display apparatus of claim 4, wherein the data driving part generates and outputs the data signal using image data, to which luminance offset data corresponding to the first to N-th display areas, is applied.

11. The display apparatus of claim 10, further comprising:

a lookup table configured to store the luminance offset data.

12. The display apparatus of claim 1, wherein when image data to be displayed on the display panel is a toggle pattern, the transition time of the data signal increases according to the decrease of the load of the display panel.

13. The display apparatus of claim 12, wherein when the image data to be displayed on the display panel is a direct current pattern, the transition time of the data signal is maintained.

14. The display apparatus of claim 1, wherein when image data to be displayed on the display panel includes a toggle pattern and a direct current pattern, the transition time of the data signal applied to an area displaying the toggle pattern increases according to the decrease of the load of the display panel, and the transition time of the data signal applied to an area displaying the direct current pattern is maintained.

15. A method of driving a display apparatus, the method comprising:

outputting a gate signal to a gate line of a display panel which displays an image; and outputting a data signal to a data line, wherein a transition time of the data signal is a time when the data signal transitions from a low level to a high level, the transition time of the data signal increases when a load of the display panel decreases, and when image data to be displayed on the display panel includes a toggle pattern and a direct current pattern, the transition time of the data signal applied to an area displaying the toggle pattern increases according to the decrease of the load of the display panel, and the transition time of the data signal applied to an area displaying the direct current pattern is maintained.

16. The method of claim 15, wherein the display panel sequentially comprises first to N-th (where N is a natural number not less than two) display areas in a direction in which the data line extends, the transition time of the data signal applied to the first display area has a first time, and the transition time of the data signal applied to the N-th display area has an N-th time that is shorter than the first time.

17. The method of claim 15, wherein transition times of the data signal, applied to the first to (N−1)-th display areas, are determined using the transition time of the data signal applied to the N-th display area and delayed.

18. The method of claim 17, further comprising:

outputting a transfer pulse signal for controlling an output timing of the data signal, wherein a high period of the transfer pulse signal for controlling the output timing of the data signal applied to the first display area has a first period, and a high period of the transfer pulse signal for controlling the output timing of the data signal applied to the N-th display area has an N-th period that is longer than the first period.

19. A display apparatus comprising:

a display panel configured to display an image, and comprising a gate line and a data line;

a gate driving part configured to output a gate signal to the gate line;

a data driving part configured to output a data signal to the data line; and a timing controlling part, wherein the timing controlling part comprises:

a pattern detecting part configured to receive first image data, detect patterns in the first image data, and output pattern detection data;

a lookup table configured to store parameters corresponding to a plurality of display areas in the display panel; and a micro controlling part configured to receive the first image data, generate second image data and transition time control data using the first image data, the pattern detection data, and the lookup table, and output the second image data and the transition time control data to the data driving part, and wherein the transition time control data is used to control a transition time and a slew of the data signal.

* * * * *